United States Patent

Verbeeten et al.

[11] Patent Number: 5,816,370
[45] Date of Patent: Oct. 6, 1998

[54] DISC BRAKE LINING WITH A NOISE-DAMPING PLATE

[75] Inventors: Wilhem Verbeeten, Hilden; Armin Eckert, Waltrop, both of Germany

[73] Assignee: Rufas Pagid Aktiengesellschaft, Essen, Germany

[21] Appl. No.: 836,725

[22] PCT Filed: Nov. 3, 1995

[86] PCT No.: PCT/EP95/04310

§ 371 Date: May 9, 1997

§ 102(e) Date: May 9, 1997

[87] PCT Pub. No.: WO96/15386

PCT Pub. Date: May 23, 1996

[30] Foreign Application Priority Data

Nov. 10, 1994 [DE] Germany ............ 94 17 974.3 U
Mar. 3, 1995 [DE] Germany ............ 295 03 656 U

[51] Int. Cl.$^6$ .................................................. F16D 65/38
[52] U.S. Cl. .............. 188/73.37; 188/22 E; 188/25 G; 188/1.11 L
[58] Field of Search .................. 188/73.37, 250 G, 188/1.11 L, 1.11 W, 264 G, 250 E, 250 D, 234, 247, 73.36

[56] References Cited

U.S. PATENT DOCUMENTS

| | | |
|---|---|---|
| 1,296,843 | 3/1919 | Olson ................................. 188/250 G |
| 3,689,880 | 9/1972 | McKee et al. ................. 188/1.11 L X |
| 3,966,026 | 6/1976 | Filderman ............................. 188/73.37 |
| 4,508,196 | 4/1985 | Jamon ................................ 188/1.11 L |
| 4,722,424 | 2/1988 | Ikeuchi ................................ 188/73.37 |
| 4,858,732 | 8/1989 | Taylor, Jr. ........................... 188/250 G |
| 5,099,962 | 3/1992 | Furusu et al. ........................ 188/73.37 |
| 5,518,088 | 5/1996 | Brosilow .............................. 188/73.37 |

FOREIGN PATENT DOCUMENTS

| | | |
|---|---|---|
| 72192 | 2/1983 | European Pat. Off. . |
| 1394819 | 3/1965 | France .................... 188/250 G |
| 4142196 | 4/1983 | Germany . |
| 40-4258532 | 9/1992 | Japan ..................... 188/250 E |
| 40-6002721 | 1/1994 | Japan .................... 188/1.11 L |
| 2022733 | 12/1979 | United Kingdom ............ 188/73.37 |

*Primary Examiner*—Peter M. Poon
*Attorney, Agent, or Firm*—Blakely Sokoloff Taylor & Zafman

[57] ABSTRACT

The disc-brake lining proposed has a lining-mounting plate, a friction lining mounted on one side of the mounting plate and a noise-damping plate bonded to the other side of the mounting plate. The mounting plate has two apertures which are partly filled with underlayer compound and have countersunk bores. The noise-damping plate has holes located at a series of aligned points and is bent in the shape of a cone at these points. The noise-damping plate is prevented from slipping sideways by screws whose heads fit entirely into the conically bent zones of the noise-damping plate. Instead of screws, a rivet can be used to fix the noise-damping plate in place, the rivet securing both the noise-damping plate and also a chatter-prevention spring on the mounting plate.

15 Claims, 2 Drawing Sheets

DISC BRAKE LINING WITH A NOISE-DAMPING PLATE

The invention relates to a disc brake lining in particular with a noise-damping plate and the fastening thereof to the lining support plate.

Noise-damping plates are generally stuck onto the side of the lining support plate remote from the friction lining with cold- or hot-setting polymer layers. The nature of this polymer layer is crucial for the noise-damping properties of the plate. Viscoelastic polymers promote the noise-damping properties of the plate and are preferably used. Such polymer layers are, however, temperature sensitive and can frequently not transmit the shear forces which are produced when braking, to a satisfactory extent at high temperatures. Means are therefore additionally provided which secure the plates against slipping sideways. Such means which absorb shear forces include, in the prior art, flanged noise-damping plate formations which engage around the side surfaces of the support plates. It is also known to press the noise-damping plate into recesses in the support plate. The connection produced between the support plate and the noise-damping plate in these known solutions still did not have the desired reliability under certain conditions and loads.

It is known from EP-A 0373333 to rivet the noise-damping plate together with a mounting spring onto the support plate and to secure it against rotation with the aid of local recesses or guide lugs, which engage in the corresponding support plate recess. The head of the rivet projects in this known construction outwardly out of the plane of the noise-damping plate and can impair the function of the pressure mechanisms of the brake. A vibration bridge can be formed by a metallic connection between the carrier plate and noise-damping plate whereby the noise-damping properties are impaired. Reference is made to the significance of such vibration bridges in DE-A 4104812.

It is the object of the invention to provide a disc brake lining provided with a noise-damping plate in which a satisfactorily strong and reliable connection is produced between the carrier plate and the noise-damping plate without noticeable side effects.

In a disc brake lining with a lining support plate, a friction lining pressed onto one side of the lining support plate and a noise-damping plate fastened to the other side of the lining support plate by means of an adhesive layer, this object is solved in accordance with the invention if the lining support plate has at least two through openings which are at least partially filled with underlayer composition and/or friction composition and are each provided with a countersunk bore; if the noise-damping plate has holes and is conically deformed in alignment with the countersunk bores; if a countersunk screw is screwed into each countersunk bore such that its head draws the portion of the noise-damping plate which is conically deformed and aligned with the countersunk bore into the broadened portion of the countersunk bore, whereby the adhesive layer between the noise-damping plate and the broadened portion of the countersunk bore is under pressure and the head of the countersunk screw is completely received in the conically deformed portion of the noise-damping plate.

Since the underlayer composition or the friction composition itself has a vibration damping effect and the free surface of the noise-damping plate is provided with a lacquer, no vibration bridges are generally produced. An additional vibration damping effect can be achieved if a damping disc, e.g. one of a high temperature resistant rubber, is introduced between the screw head and the noise-damping plate and/or the screw head is coated with a damping lacquer. Another possibility for achieving additional damping properties resides in bonding the countersunk screw in the countersunk bore with an elastic adhesive.

For disc brake linings without a mounting spring, but with a riveted on chatter prevention spring, the solution in accordance with the invention of the problem referred to above resides in the features of "FIG. 3 and accompanying descriptions".

The noise-damping plate is fastened to the lining support plate and secured against release and displacement in this inventive alternative by the rivet holding the chatter prevention spring. The rotational securement of the noise-damping plate with respect to the support plate is ensured in a preferred embodiment of the invention by a form-locking connection between the two of them. In a further embodiment of the invention the form-locking connection is produced by a particular construction of the rivet connection. In this, the openings in the lining support plate and in the noise-damping plate have non-circular cross-sections. The hollow rivet provided with the chatter prevention spring is pushed into these non-circular openings and riveted in, whereby the hollow rivet is deformed to match the shape of the openings, provided that hollow rivets with a corresponding non-circular cross-section are not used. The noise-damping plate is prevented in this manner from being able to rotate about the rivet on the support plate. Openings which are provided, for instance, with oval, polygonal, angular or flat sections provide rotational security in conjunction with hollow rivets.

The invention will be described below in more detail with reference to exemplary embodiments which are schematically illustrated in the drawings, in which.

Figure 1:
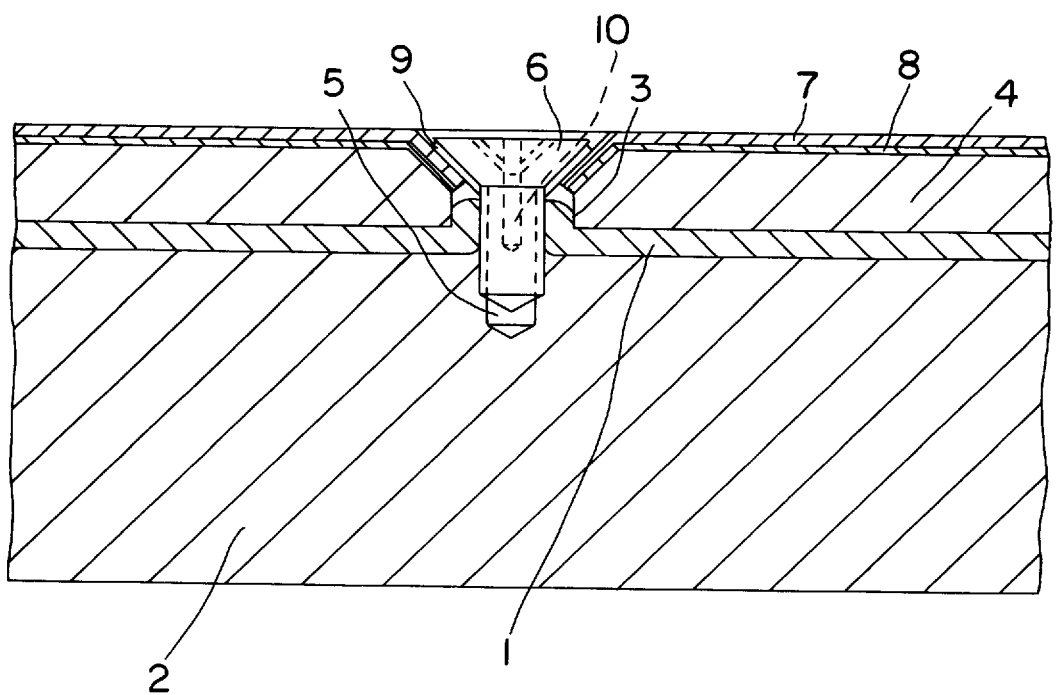
FIG. 1 is an enlarged scrap sectional view of the disc brake lining with the fastening of the noise-damping plate in accordance with a first exemplary embodiment of the invention.

In the disc brake lining shown in the scrap view of FIG. 1, an underlayer layer 1 and a friction composition layer 2 are hot pressed onto a lining support plate 4. During this pressing process, round through openings 3, which are arranged in the support plate, are partially filled by the compositions of the layers 1 and 2. A countersunk bore 5, which is formed as a blind hole and broadens conically outwardly and extends about 3 mm into the friction composition layer 2, is bored into the partially filled through opening 3. Stuck onto the surface of the lining support plate 4 with a cold-setting polymer layer 8 is a noise-damping plate 7. The noise-damping plate 7 is apertured in alignment with the countersunk bore 5 and conically deformed so that its conically deformed region fits into the broadened portion of the countersunk bore 5 and provides within it sufficient space for the accommodation of the frustoconical head of a countersunk screw 6. The countersunk screw 6 in the described exemplary embodiment is a self-cutting brass plate screw with a cross slot. It is screwed together with a washer 9 of nitrite rubber into the countersunk bore 5 and thus presses the noise-damping plate 7 with the polymer layer 8 against the conically broadened portion of the countersunk bore 3 in the lining support plate 4. The noise-damping plate 7 is fastened to the support plate 4 with two such countersunk screws and is thus secured against both displacement and rotation without vibration bridges being able to be produced.

As may be seen in FIG. 1, the size of the screw head and the depth to which the countersunk screw is screwed in are so dimensioned that the screw head is entirely accommodated in the conically deformed portion of the noise-damping plate 7, in the installed position, that is to say does not project beyond the outer plane of the noise-damping plate.

The countersunk screw 6 has an axial blind bore 10, which starts from the cross slot and serves as a plug contact for a wear indicator. The countersunk screw 6 must comprise a good conductive material, such as copper or brass, and be screwed so far into the friction composition that contact with the brake disc is produced by wear of the friction lining before the friction composition is completely worn away.

Figure 2:
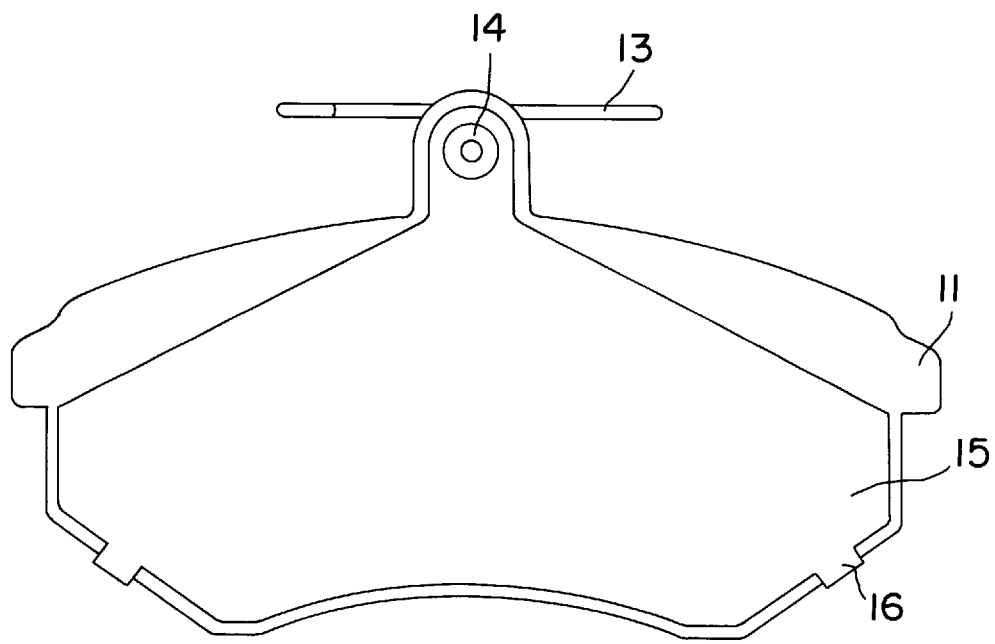
FIG. 2 is a plan view of the side of the brake lining which is remote from the friction lining and carries a noise-damping plate in accordance with an alternative exemplary embodiment of the invention.
Figure 3:
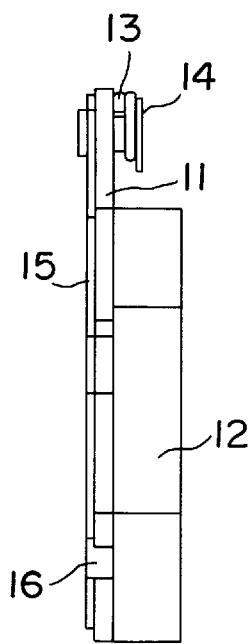
FIG. 3 is a side view of the brake lining shown in FIG. 2.

The brake lining in accordance with an alternative exemplary embodiment of the invention shown schematically in FIGS. 2 and 3 has a lining support plate 11, which preferably comprises steel, onto one side of which a friction lining 12 is pressed in such a configuration that a surface section remains free for a spring fastening. Stuck onto the opposite side with a viscoelastic, temperature resistant adhesive is a noise-damping plate 15. The noise-damping plate 15 extends upwardly in a tongue which has been bored through and has two lateral guide lugs 16. Arranged in both the support plate 11 and in the noise-damping plate 15 are bores of the same cross-section which are aligned with one another. A hollow rivet 14, provided with a chatter prevention spring 13 pushed onto it, is pushed through these aligned bores and flanged over on the side of the noise-damping plate 15. The guide lugs 16, which project by about the thickness of the support plate, are bent over in the direction of the friction lining 12 around the edges of the support plate 11.

Instead of bores in the support plate 11 and the noise-damping plate 15, non-circular openings can be provided which, in conjunction with a rivet shaft fitted into them, produce a rotational fastening between the lining support plate 11 and the noise-damping plate 15.

We claim:

1. A disc brake lining with a lining support plate, a friction lining pressed onto one side of the lining support plate, a noise-damping plate fastened to the other side of the lining support plate by means of an adhesive layer and with means absorbing shear forces for securing the noise-damping plate against lateral slipping, the lining support plate having at least two through holes partially filled with a composition selected from a group consisting of underlayer composition, friction composition and a combination of said underlayer composition and said friction composition, wherein the through holes are each provided with a countersunk bore comprising a broadened portion;

the noise-damping plate has holes and a conically deformed portion which is in alignment with the countersunk bores; and wherein a countersunk screw with a head and an end portion is screwed into each countersunk bore and said composition such that the head draws the conically deformed portion of the noise-damping plate into the broadened portion of the countersunk bore, whereby the adhesive layer between the noise-damping plate and the broadened portion of the countersunk bore is under pressure and the head of the countersunk screw is completely accommodated in the conically deformed portion of the noise-damping plate.

2. The disc brake lining as claimed in claim 1, wherein the countersunk screw is secured in the countersunk bore by adhesive.

3. The disc brake lining as claimed in claim 2, wherein a washer is arranged between the head of the countersunk screw and the noise damping plate.

4. The disc brake lining as claimed in claim 3, wherein the countersunk screw is provided with an outwardly open bore and the end portion of the screw projects into the friction lining.

5. The disc brake lining as claimed in claim 2, wherein the countersunk screw is provided with an outwardly open bore and the end portion of the screw projects into the friction lining.

6. The disc brake lining as claimed in claim 1, wherein a washer is arranged between the head of the countersunk screw and the noise-damping plate.

7. The disc brake lining as claimed in claim 6, wherein the countersunk screw is provided with an outwardly open bore and the end portion of the screw projects into the friction lining.

8. The disc brake lining as claimed in claim 1, wherein the countersunk screw is provided with an outwardly open bore and the end portion of the screw projects into the friction lining.

9. A disc brake lining with a lining support plate having a first and a second side and an edge, said disk brake lining comprising a friction lining which is so arranged on the first side of the lining support plate that a portion of said first side is free of said friction lining; a chatter prevention spring; and a noise-damping plate which is fastened to the second side of the lining support plate by adhesive and is secured together with the chatter prevention spring to the lining support plate, wherein the chatter prevention spring is arranged on said portion of the first side of the lining support plate which is free of said friction lining; and wherein the noise-damping plate and the chatter prevention spring are commonly fastened by a rivet extending through the lining support plate.

10. The disc brake lining as claimed in claim 9, where the rivet is a hollow rivet.

11. The disc brake lining as claimed in claim 10, wherein the noise-damping plate is secured against rotation by means of a form-locking connection with the lining support plate.

12. The disc brake lining as claimed in claim 11, wherein the noise-damping plate is provided with at least one guide lug which is bent around the edge of the lining support plate.

13. The disc brake lining as claimed in claim 11, wherein the hollow rivet is fitted into non-circular openings in the lining support plate and the noise-damping plate.

14. The disc brake lining as claimed in claim 9, wherein the noise-damping plate is secured against rotation by means of a form-locking connection with the lining support plate.

15. The disc brake lining as claimed in claim 14, wherein the noise-damping plate is provided with at least one guide lug which is bent around the edge of the lining support plate.

* * * * *